United States Patent
Hoover et al.

(10) Patent No.: US 12,391,401 B2
(45) Date of Patent: Aug. 19, 2025

(54) SEAT MOUNTED INBOARD FLIGHT CONTROLLERS FOR AIRCRAFT PILOT SEATS

(71) Applicant: AMI Industries, Inc., Colorado Springs, CO (US)

(72) Inventors: Douglas E. Hoover, Colorado Springs, CO (US); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 265 days.

(21) Appl. No.: 18/229,493

(22) Filed: Aug. 2, 2023

(65) Prior Publication Data
US 2025/0042555 A1    Feb. 6, 2025

(51) Int. Cl.
  *B64C 13/06* (2006.01)
  *B64D 11/06* (2006.01)
  *B64D 43/00* (2006.01)

(52) U.S. Cl.
  CPC .......... B64D 43/00 (2013.01); B64D 11/0689 (2013.01)

(58) Field of Classification Search
  CPC ... B64D 43/00; B64D 11/0689; B64C 13/042; B64C 13/044; B64C 13/06; B64C 13/12
  See application file for complete search history.

(56) References Cited

U.S. PATENT DOCUMENTS

| | | | |
|---|---|---|---|
| 3,580,636 A | | 5/1971 | Setto |
| 4,574,651 A | * | 3/1986 | Nordstrom ............... G05G 1/01 244/234 |
| 4,763,860 A | | 8/1988 | Vauvelle et al. |
| 5,137,234 A | * | 8/1992 | Sakurai ............... B64C 13/0421 244/237 |
| 5,156,363 A | | 10/1992 | Cizewski et al. |
| 5,769,363 A | * | 6/1998 | Griswold ............... G05G 9/047 74/553 |
| 6,347,770 B1 | | 2/2002 | Oyzerskiy et al. |
| 8,028,960 B2 | | 10/2011 | Wassenhove et al. |
| 8,052,097 B2 | | 11/2011 | Rollet |

(Continued)

FOREIGN PATENT DOCUMENTS

CN    202257277 U    5/2012

OTHER PUBLICATIONS

European Search Report received in EP Application No. 24191830, Nov. 8, 2024, 6 pages.

*Primary Examiner* — Amy J. Sterling
(74) *Attorney, Agent, or Firm* — Suiter Swantz IP

(57) ABSTRACT

Seat mounted inboard flight controllers for aircraft pilot seats cause the flight controllers to move with the pilot and copilot seats as the seats are adjusted forward and aft. The flight controllers are tied to the seats and move with the seats via the extenders and flight controller mounting brackets. The two flight controllers are coupled together using a linear bearing. One half of the linear bearing is attached to the inboard side of the flight controller. The other half of the linear bearing attaches to the inboard side of the copilot cyclic flight controller. The flight controllers attach to a mounting bracket that extends down to the extenders that attach to the seats. A complete load path is formed between the pilot and copilot seats that support the flight controllers without mounting anything to the cockpit center column.

15 Claims, 13 Drawing Sheets

(56) References Cited

U.S. PATENT DOCUMENTS

| | | |
|---|---|---|
| 8,812,177 B2 | 8/2014 | Yates et al. |
| 8,991,770 B2 | 3/2015 | Bandera |
| 9,056,675 B2 | 6/2015 | Yates et al. |
| 9,452,839 B2 | 9/2016 | Chatrenet et al. |
| 9,764,830 B2 | 9/2017 | Yates et al. |
| 9,908,614 B2 | 3/2018 | Cherepinsky et al. |
| 10,059,439 B2 | 8/2018 | Gillett et al. |
| 10,464,662 B2 | 11/2019 | Mercer et al. |
| 10,689,096 B2 * | 6/2020 | Lavallee ................. B64C 13/06 |
| 10,829,202 B2 | 11/2020 | Haugeberg |
| 11,117,653 B2 | 9/2021 | Covington et al. |
| 11,167,837 B2 | 11/2021 | Taylor |
| 11,459,109 B2 | 10/2022 | Hoover et al. |
| 11,472,535 B2 | 10/2022 | Worsham et al. |
| 11,498,685 B2 | 11/2022 | Hoover et al. |
| 11,524,786 B2 | 12/2022 | Hoover |
| 11,535,373 B2 | 12/2022 | Johnson |
| 11,577,839 B2 | 2/2023 | Hoover |
| 2011/0101176 A1 | 5/2011 | Núñez et al. |
| 2014/0138492 A1 | 5/2014 | Staagen |
| 2019/0359318 A1 | 11/2019 | Guering et al. |
| 2022/0363396 A1 | 11/2022 | Rowe et al. |

\* cited by examiner

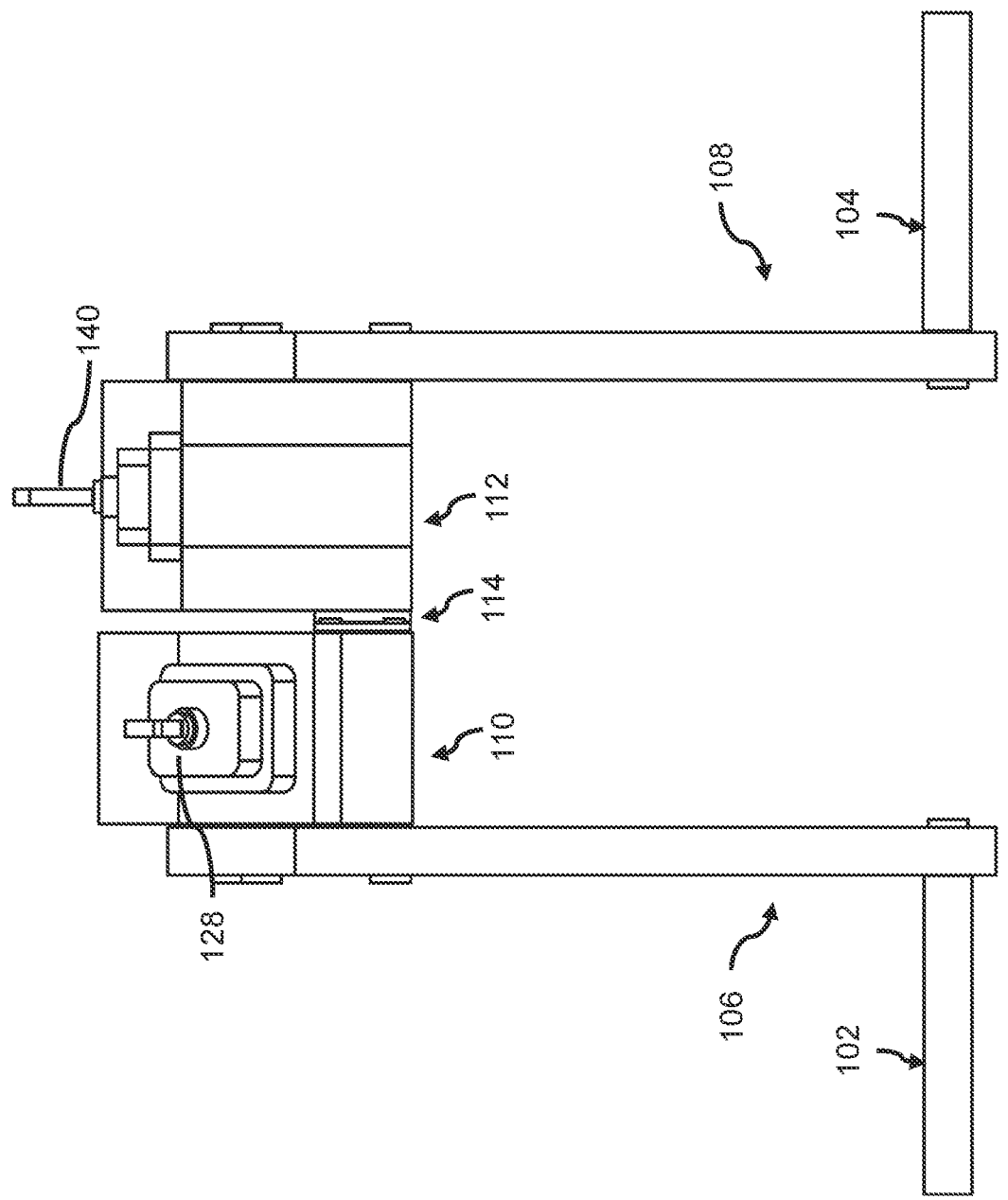

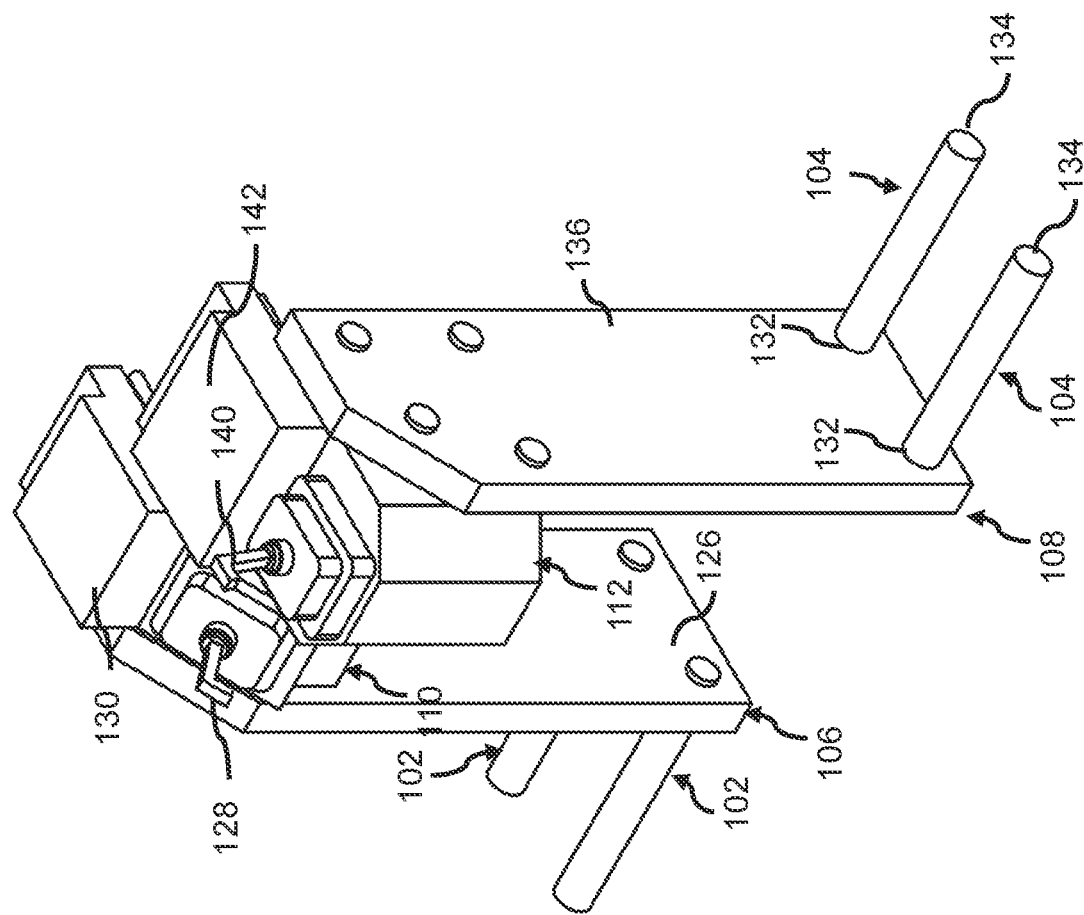

SEAT MOUNTED INBOARD FLIGHT CONTROLLERS FOR AIRCRAFT PILOT SEATS

TECHNICAL FIELD

The present invention generally relates to seats and more specifically to seats with moveable flight controllers.

BACKGROUND

Helicopters include cyclic and collective flight controls. The cyclic and collective flight controls are fixed to a center column and are not allowed to move when the crew seats move. The pilot must then either reach for the flight control or experience a compacted reach depending on the seats being in fore/aft position relative to the flight controller. Therefore, it would be advantageous to provide a device, system, and method that cures the shortcomings described above.

SUMMARY

An assembly is described. The assembly includes a first set of extenders. The assembly includes a first mounting bracket. The first set of extenders are rigidly coupled to the first mounting bracket. The assembly includes a first flight controller. The first flight controller is rigidly coupled to the first mounting bracket. The assembly includes a second set of extenders. The assembly includes a second mounting bracket. The second set of extenders are rigidly coupled to the second mounting bracket. The assembly includes a second flight controller. The second flight controller is rigidly coupled to the second mounting bracket. The assembly includes a prismatic joint. The first flight controller and the second flight controller are coupled by the prismatic joint. The first flight controller and the second flight controller are configured to translate relative to each other along the prismatic joint.

A load path is maintained from the first set of extenders through the first mounting bracket, the first flight controller, the prismatic joint, the second flight controller, and the second mounting bracket to the second set of extenders.

The first set of extenders, the first mounting bracket, and the first flight controller form a first rigid body. The second set of extenders, the second mounting bracket, and the second controller form a second rigid body.

A first end of the first set of extenders are coupled to the first mounting bracket. A first end of the second set of extenders are coupled to the second mounting bracket.

The first set of extenders are rigidly coupled to a first face of the first mounting bracket. The first flight controller is rigidly coupled to a second face of the first mounting bracket.

The first face of the first mounting bracket is coplanar with the second face of the first mounting bracket.

The prismatic joint is coupled to a side surface of the first flight controller and a side surface of the second flight controller.

The prismatic joint is a linear bearing comprising a roller bracket and a receiver bracket.

The roller bracket is coupled to one of the first flight controller or the second flight controller and the receiver bracket is coupled to a remaining of first flight controller and the second flight controller.

A system is described. The system includes a first inboard floor track. The assembly includes a first seat comprising a first seat frame coupled to the first inboard floor track. The system includes a second inboard floor track. The first inboard floor track and the second inboard floor track are parallel. The system includes a second seat comprising a second seat frame coupled to the second inboard floor track. The system includes an assembly. The assembly includes a first set of extenders. The first set of extenders are rigidly coupled to the first seat frame. The assembly includes a first mounting bracket. The first set of extenders are rigidly coupled to the first mounting bracket. The assembly includes a first flight controller. The first flight controller is rigidly coupled to the first mounting bracket. The assembly includes a second set of extenders. The second set of extenders are rigidly coupled to the second seat frame. The assembly includes a second mounting bracket. The second set of extenders are rigidly coupled to the second mounting bracket. The assembly includes a second flight controller. The second flight controller is rigidly coupled to the second mounting bracket. The assembly includes a prismatic joint. The first flight controller and the second flight controller are coupled by the prismatic joint. The first flight controller and the second flight controller are configured to translate relative to each other along the prismatic joint.

The first seat frame is configured to translate longitudinally along the first inboard floor track independent of the second seat frame. The second seat frame is configured to translate longitudinally along the second inboard floor track independent of the first seat frame.

The first flight controller is configured to translate longitudinally with the first seat frame via the first set of extenders and the first mounting bracket. The second flight controller is configured to translate longitudinally with the second seat frame via the second set of extenders and the second mounting bracket. The first flight controller and the second flight controller remain coupled by the prismatic joint as the first flight controller translates longitudinally with the first seat frame and as the second flight controller translates longitudinally with the second seat frame.

A load path is maintained from the first seat frame, through the first set of extenders, the first mounting bracket, the first flight controller, the prismatic joint, the second flight controller, the second mounting bracket, and the second set of extenders to the second seat frame.

A first end of the first set of extenders are rigidly coupled to the first mounting bracket and a second end of the first set of extenders are rigidly coupled to the first seat frame. A first end of the second set of extenders are rigidly coupled to the second mounting bracket and a second end of the second set of extenders are rigidly coupled to the second seat frame.

The first flight controller and the second flight controller are maintained at a constant height relative each other as the first flight controller and the second flight controller translate relative each other along the prismatic joint.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1B depicts a front view of an assembly, in accordance with one or more embodiments of the present disclosure.

FIG. 1H depicts a right-front isometric view of an assembly with an inboard copilot flight controller translated forwards relative to an inboard pilot flight controller, in accordance with one or more embodiments of the present disclosure.

DETAILED DESCRIPTION OF THE INVENTION

Figure 1A:
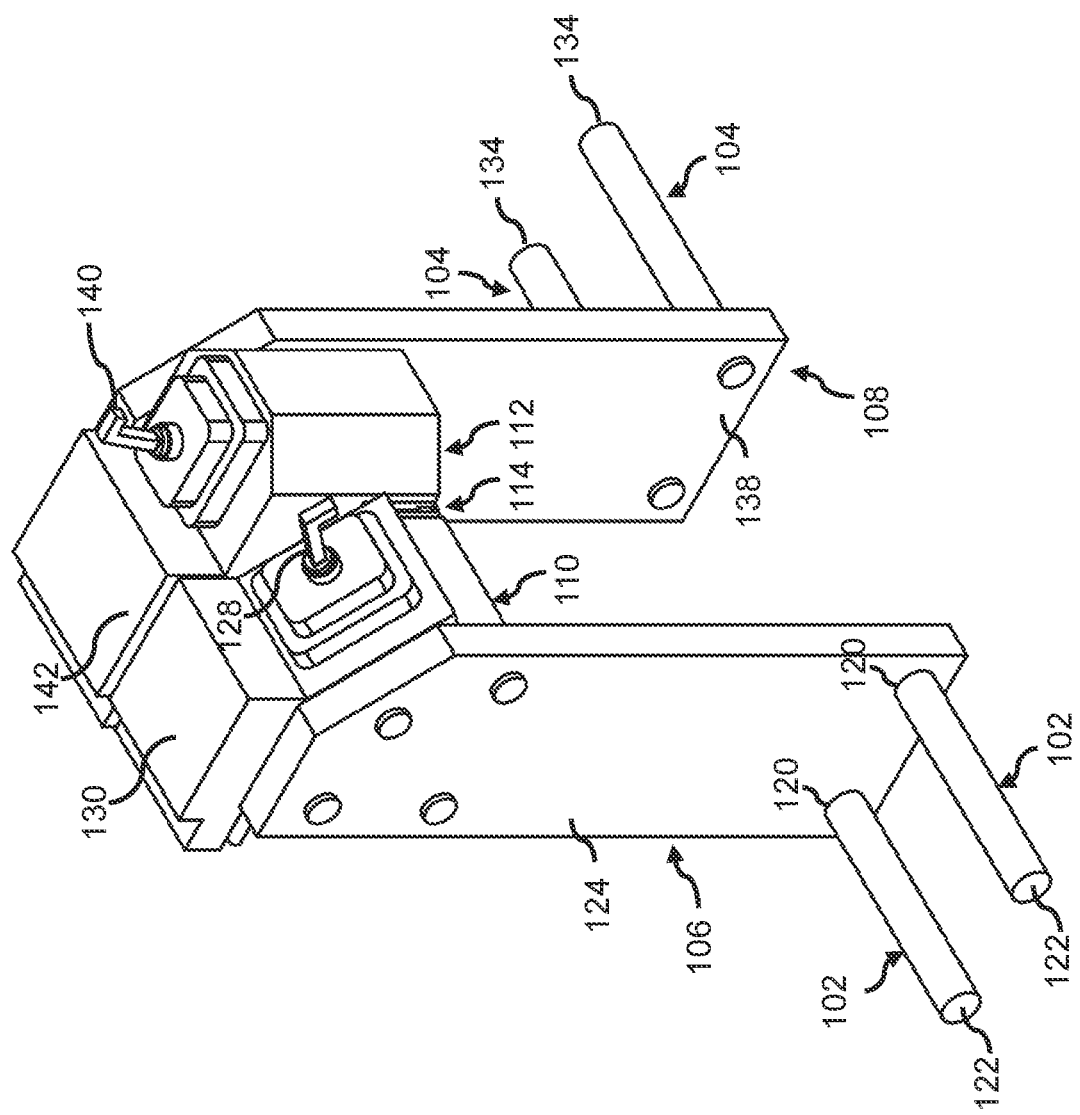
FIG. 1A depicts a left-front isometric view of an assembly, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to seat mounted inboard flight controllers for aircraft pilot seats. The flight controllers in the helicopter cockpit move with the pilot and copilot seats as the seats are adjusted forward and aft. Differently sized pilots may adjust the seats while maintaining the flight controllers at a fixed length.

Inboard flight controllers move with the seated occupant when the seat is adjusted forward and aft. The inboard flight controllers are tied to the seats and move with the seats via the extenders and flight controller mounting brackets. The collective flight controller is attached to a mounting bracket on the outboard side. The two flight controllers are coupled together using a linear bearing. One half of the linear bearing is attached to the inboard side of the flight controller. The other half of the linear bearing attaches to the inboard side of the copilot cyclic flight controller. The outboard side of this flight controller attaches to a mounting bracket that extends down to the extenders that attach to the copilot seat. A complete load path is formed between the pilot and copilot seats that support the flight controllers without mounting anything to the cockpit center column. The two seats freely move relative to each other via the linear bearing. The flight controls always move when the seat moves, preventing uncomfortable flight controller handling conditions. The pilot's position relative to the flight controls may be optimized to avoid fatigue.

U.S. Pat. No. 8,052,097, titled "Flying control device for a rotorcraft"; U.S. Pat. No. 11,167,837, titled "Aircraft with outboard throttle quadrant arrangements"; U.S. Pat. No. 9,764,830, titled "Pilot control system with adjustable pedals"; U.S. Pat. No. 9,452,839, titled "Assembly for aircraft cockpit, aircraft cockpit equipped with such assembly and aircraft"; U.S. Pat. No. 11,117,653, titled "System and method for tactile cueing through rotorcraft pilot controls using variable friction and force gradient"; U.S. Pat. No. 4,763,860, titled "Cockpit provided with a lateral control stick adapted to be actuated one-handed and seat for such a cockpit"; U.S. Pat. No. 9,908,614, titled "Crew seat integral inceptor system for aircraft"; U.S. Patent Publication Number 2014/0138492, titled "Integrated seat mounted inceptor"; U.S. Pat. No. 3,580,636, titled "Dual side arm controller"; are incorporated herein by reference in the entirety.

Figure 1C:
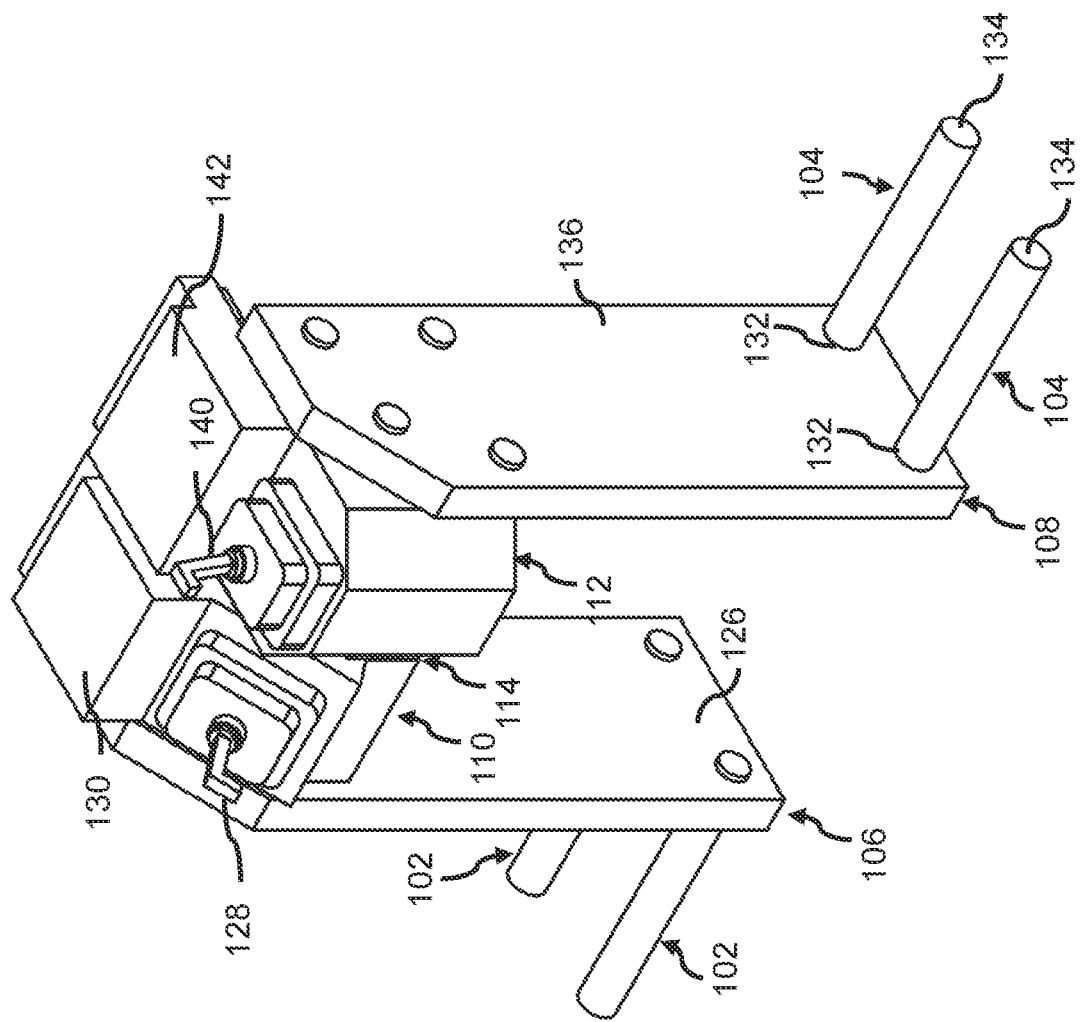
FIG. 1C depicts a right-front isometric view of an assembly, in accordance with one or more embodiments of the present disclosure.
Figure 1D:
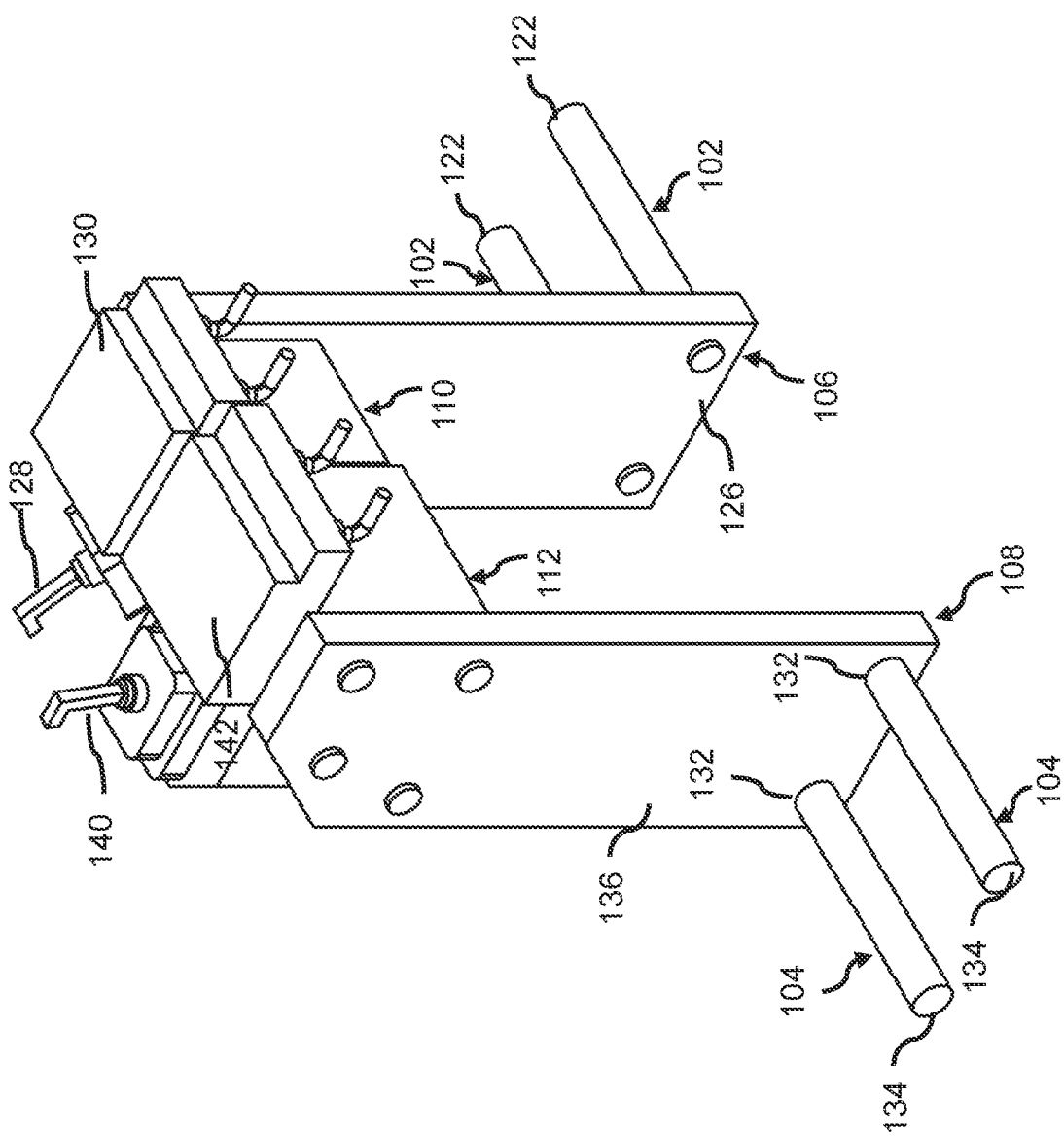
FIG. 1D depicts a right-rear isometric view of an assembly, in accordance with one or more embodiments of the present disclosure.
Figure 1E:
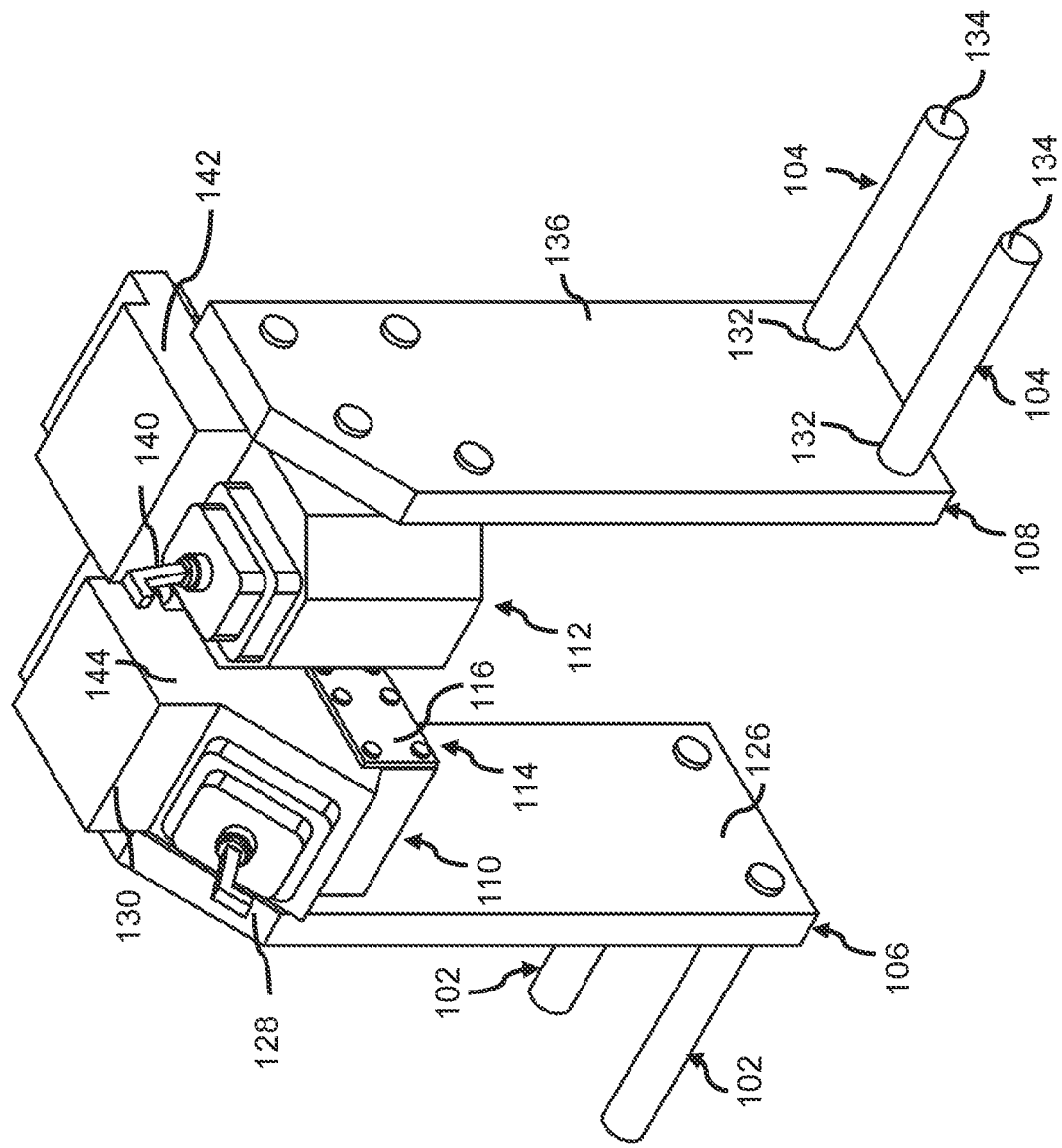
FIG. 1E depicts a right-front isometric view of an assembly with an inboard pilot flight controller translated forwards relative to an inboard copilot flight controller, in accordance with one or more embodiments of the present disclosure.
Figure 1F:
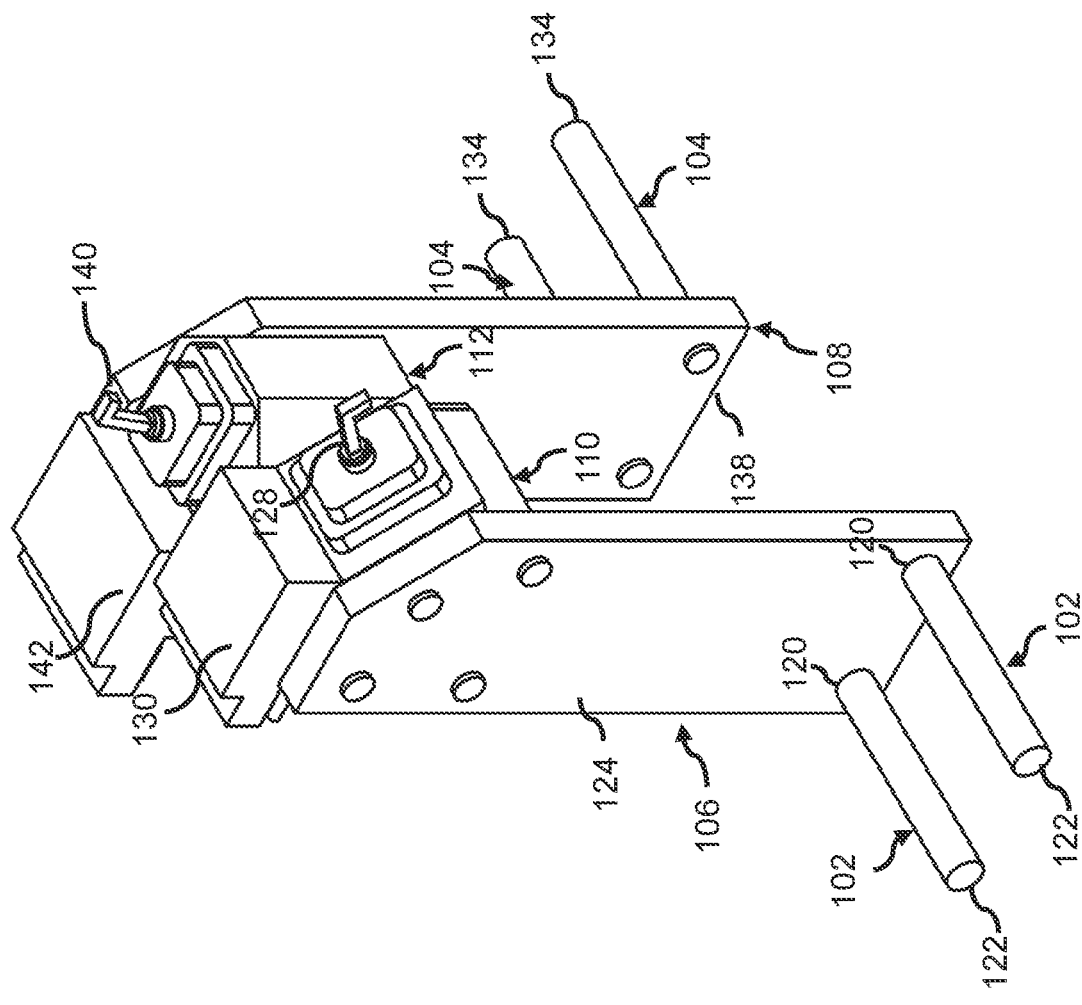
FIG. 1F depicts a left-front isometric view of an assembly with an inboard pilot flight controller translated forwards relative to an inboard copilot flight controller, in accordance with one or more embodiments of the present disclosure.
Figure 1G:
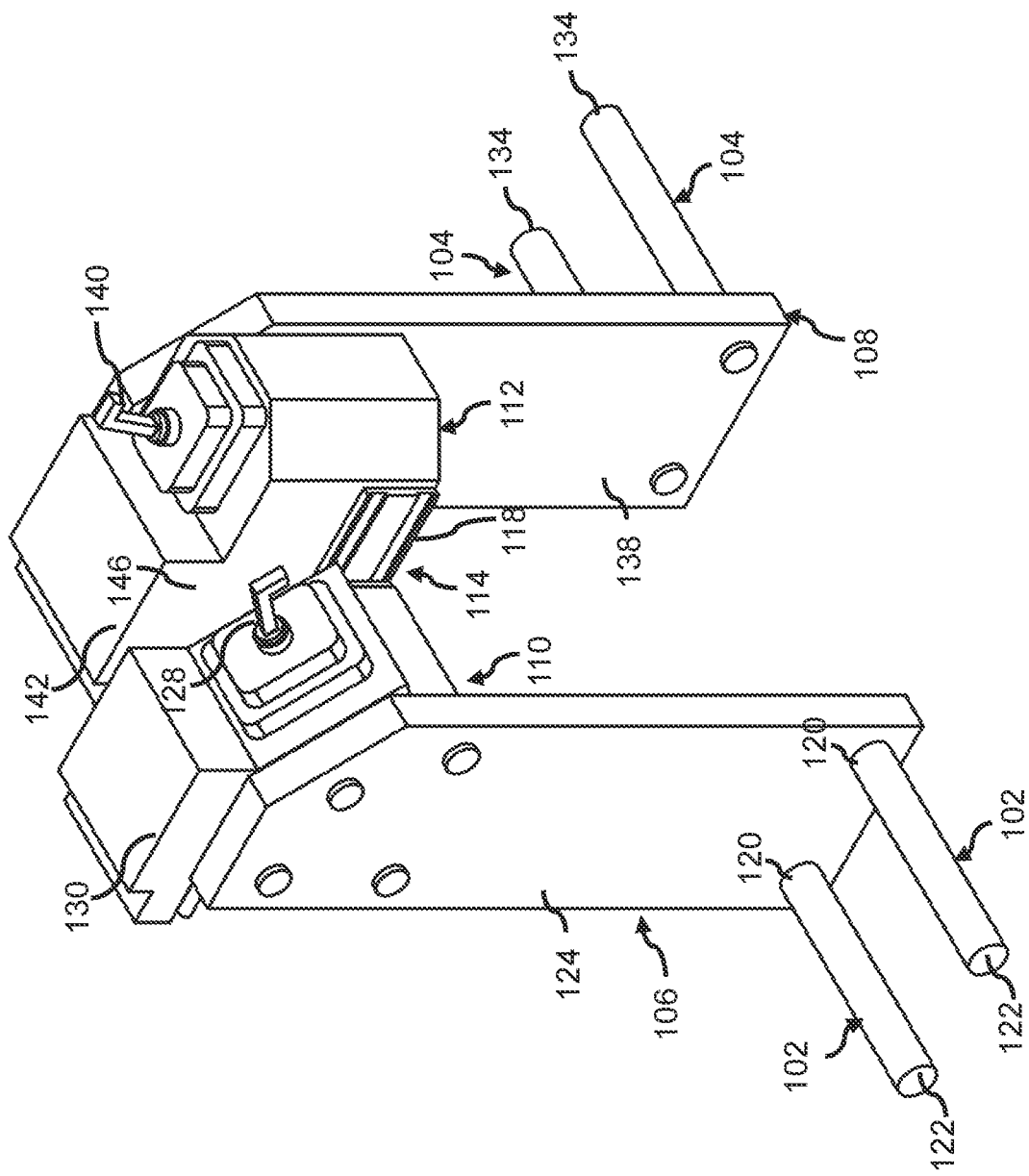
FIG. 1G depicts a left-front isometric view of an assembly with an inboard copilot flight controller translated forwards relative to an inboard pilot flight controller, in accordance with one or more embodiments of the present disclosure.

Referring now to FIGS. 1A-1H, an assembly 100 is described, in accordance with one or more embodiments of the present disclosure. The assembly 100 may include one or more components, such as, but not limited to, a set of extenders 102, set of extenders 104, mounting bracket 106, mounting bracket 108, flight controller 110, flight controller 112, prismatic joint 114, and the like.

The assembly 100 includes the set of extenders 102. The set of extenders 102 may also be referred to as a first set of extenders or a pilot seat base extender. The set of extenders 102 may include any number of extenders. For example, the set of extenders 102 may have two or more extenders. In some embodiments, the set of extenders 102 are tubes. The set of extenders 102 include an end 120 and an end 122. The end 120 may also be referred to as a first end. The end 122 may also be referred to as a second end. The end 120 is opposite to the end 122.

The assembly 100 includes the mounting bracket 106. The mounting bracket 106 may also be referred to as a first mounting bracket or a pilot seat mounting bracket. The mounting bracket 106 includes a face 124 and a face 126. The face 124 may also be referred to as a first face. The face 126 may also be referred to as a second face. The face 124 is opposite to the face 126. The face 124 and the face 126 may also include one or more recesses (not depicted). The recesses may reduce a weight of the mounting bracket 106. As depicted, the face 124 and the face 126 are coplanar. For example, the mounting bracket 106 may be shaped as a panel.

The set of extenders 102 are coupled to the mounting bracket 106. The set of extenders 102 are rigidly coupled to the mounting bracket 106. The end 120 of the set of extenders 102 are coupled to the mounting bracket 106. The set of extenders 102 are coupled to the face 124 of the mounting bracket 106. In some embodiments, the end 120 of the set of extenders 102 are coupled to the face 124 of the mounting bracket 106 proximate to a bottom-most surface of the mounting bracket 106. In some embodiments, the set of extenders 102 are orthogonal to the mounting bracket 106. For example, a length of the set of extenders 102 between the end 120 and the end 122 is orthogonal to the face 124 of the mounting bracket 106.

The assembly 100 includes the flight controller 110. The flight controller 110 may also be referred to as a first flight controller, inceptor (e.g., active inceptor), inboard flight controller, pilot flight controller, inboard pilot flight controller, collective flight controller, inboard collective flight controller, pilot collective flight controller, or the like. The flight controller 110 may include a joystick 128 or the like. The joystick 128 may be a collective joystick. The flight controller 110 is configured to interface with a fly-by-wire system of an aircraft to transmit inputs of the joystick 128 to the fly-by-wire system. The flight controller 110 may include an armrest surface 130. The armrest surface 130 is a topmost surface of the flight controller 110. In some embodiments, the flight controller 110 includes a mechanism (not depicted) to adjust a height of the armrest surface 130 relative to the joystick 128.

The flight controller 110 is coupled to the mounting bracket 106. The flight controller 110 is rigidly coupled to the mounting bracket 106. The flight controller 110 is coupled to the face of the mounting bracket 106. As depicted, a face of the flight controller 110 is coupled to the face 126 of the mounting bracket 106. The face of the flight controller 110 is coupled to the face 126 of the mounting bracket 106 when the face 124 of the flight controller 110 is coplanar with the face 126 of the flight controller 110 (i.e., when the mounting bracket is shaped as a panel).

Although the face 124 and the face 126 are described as being coplanar, this is not intended as a limitation of the present disclosure. It is further contemplated that the face 126 may be orthogonal to the face 124. For example, the mounting bracket 106 may be a Γ-shape (e.g., inverse L-shape). In this example, the face 126 is the top surface of the Γ-shape. Similarly, although the face of the flight controller 110 is described as being coupled to the face 126 of the mounting bracket 106, this is not intended as a limitation of the present disclosure. For example, a bottom surface of the flight controller 110 is coupled to the face 126 of the mounting bracket 106. The bottom surface of the flight controller 110 is coupled to the face 126 of the mounting bracket 106 where the face 126 of the flight controller 110 is orthogonal to the face 124 of the flight controller 110 (i.e., when the mounting bracket 106 is a Γ-shape). However, it is contemplated that coupling the face of the flight controller 110 to the face 126 of the mounting bracket 106 may be more desirable than coupling the bottom surface of the flight controller 110 to the face 126 of the mounting bracket 106 to reduce the height of the flight controller 110 relative to the set of extenders 102 (and similarly reduce a height of the flight controller 110 within an aircraft).

The set of extenders 102, the mounting bracket 106, and the flight controller 110 form a rigid body. Linear translation of any of the set of extenders 102, the mounting bracket 106, and the flight controller 110 induces linear translation of a remainder of the set of extenders 102, the mounting bracket 106, and the flight controller 110.

The previous discussion of the set of extenders 102, the mounting bracket 106, and the flight controller 110 is incorporated herein by reference in the entirety as to the set of extenders 104, the mounting bracket 108, and the flight controller 112 respectively.

The assembly 100 includes the set of extenders 104. The set of extenders 104 may also be referred to as a second set of extenders or a copilot seat base extender. The set of extenders 104 may include any number of extenders. For example, the set of extenders 104 may have two or more extenders. In some embodiments, the set of extenders 104 are tubes. The set of extenders 104 include an end 132 and an end 134. The end 132 may also be referred to as a first end. The end 134 may also be referred to as a second end. The end 132 is opposite to the end 134.

The assembly 100 includes the mounting bracket 108. The mounting bracket 108 may also be referred to as a second mounting bracket or a copilot mounting bracket. The mounting bracket 108 includes a face 136 and a face 138. The face 136 may also be referred to as a first face. The face 138 may also be referred to as a second face. The face 136 is opposite to the face 138. The face 136 and the face 138 may also include one or more recesses (not depicted). The recesses may reduce a weight of the mounting bracket 108. As depicted, the face 136 and the face 138 are coplanar. For example, the mounting bracket 108 may be shaped as a panel.

The set of extenders 104 are coupled to the mounting bracket 108. The set of extenders 104 are rigidly coupled to the mounting bracket 108. The end 132 of the set of extenders 104 are coupled to the mounting bracket 108. The set of extenders 104 are coupled to the face 136 of the mounting bracket 108. In some embodiments, the end 132 of the set of extenders 104 are coupled to the face 136 of the mounting bracket 108 proximate to a bottom-most surface of the mounting bracket 108. In some embodiments, the set of extenders 104 are orthogonal to the mounting bracket 108. For example, a length of the set of extenders 104 between the end 132 and the end 134 is orthogonal to the face 136 of the mounting bracket 108.

The assembly 100 includes the flight controller 112. The flight controller 112 may also be referred to as a second flight controller, inceptor (e.g., active inceptor), inboard flight controller, copilot flight controller, inboard copilot flight controller, cyclic flight controller, inboard cyclic flight controller, copilot cyclic flight controller, or the like. The flight controller 112 may include a joystick 140 or the like. The joystick 140 may be a cyclic joystick. The flight controller 112 is configured to interface with a fly-by-wire system of the aircraft to transmit inputs of the joystick 140 to the fly-by-wire system. The flight controller 112 may include an armrest surface 142. The armrest surface 142 is a topmost surface of the flight controller 112. In some embodiments, the flight controller 112 includes a mechanism (not depicted) to adjust a height of the armrest surface 142 relative to the joystick 140.

The flight controller 112 is coupled to the mounting bracket 108. The flight controller 112 is rigidly coupled to the mounting bracket 108. The flight controller 112 is coupled to the face of the mounting bracket 108. As depicted, a face of the flight controller 112 is coupled to the face 138 of the mounting bracket 108. The face of the flight controller 112 is coupled to the face 138 of the mounting bracket 108 when the face 136 of the flight controller 112 is coplanar with the face 138 of the flight controller 112 (i.e., when the mounting bracket is shaped as a panel).

Although the face 136 and the face 138 are described as being coplanar, this is not intended as a limitation of the present disclosure. It is further contemplated that the face 138 may be orthogonal to the face 136. For example, the mounting bracket 108 may be a Γ-shape (e.g., inverse L-shape). In this example, the face 138 is the top surface of the Γ-shape. Similarly, although the face of the flight controller 112 is described as being coupled to the face 138 of the mounting bracket 108, this is not intended as a limitation of the present disclosure. For example, a bottom surface of the flight controller 112 is coupled to the face 138 of the mounting bracket 108. The bottom surface of the flight controller 112 is coupled to the face 138 of the mounting bracket 108 where the face 138 of the flight controller 112 is orthogonal to the face 136 of the flight controller 112 (i.e., when the mounting bracket 108 is a Γ-shape). However, it is contemplated that coupling the face of the flight controller 112 to the face 138 of the mounting bracket 108 may be more desirable than coupling the bottom surface of the flight controller 112 to the face 138 of the mounting bracket 108 to reduce the height of the flight controller 112 relative to the set of extenders 104 (and similarly reduce a height of the flight controller 112 within an aircraft).

The set of extenders 104, the mounting bracket 108, and the flight controller 112 form a rigid body. Linear translation of any of the set of extenders 104, the mounting bracket 108, and the flight controller 112 induces linear translation of a remainder of the set of extenders 104, the mounting bracket 108, and the flight controller 112.

The assembly 100 includes the prismatic joint 114. The prismatic joint 114 may also be referred to as a slider, a sliding joint, or the like. The flight controller 110 and the flight controller 112 are coupled by the prismatic joint 114. The prismatic joint 114 is coupled between the flight controller 110 and the flight controller 112. The prismatic joint 114 is coupled to a side surface of each of the flight controller 110 and the flight controller 112. For example, the prismatic joint 114 is coupled to a side surface 144 of the flight controller 110 and to a side surface 146 of the flight controller 112. The side surface 144 is orthogonal to the armrest surface 130. The side surface 146 is orthogonal to the armrest surface 142. The side surface 144 is coplanar with the side surface 146.

The flight controller 110 and the flight controller 112 are configured to translate relative to each other by the prismatic joint 114. For example, the prismatic joint 114 may permit rectilinear translation or the like. The prismatic joint 114 constrains the flight controller 110 and the flight controller 112 to one degree-of-freedom relative to each other. The one degree-of-freedom is translation of the flight controller 110 and the flight controller 112 along the prismatic joint 114. The flight controller 110 and the flight controller 112 are prevented from translating in another axis and from rotating relative to each other. Thus, the flight controller 110 and the flight controller 112 are configured to translate relative to each other along the prismatic joint 114. For example, the flight controller 110 and the flight controller 112 are configured to rectilinearly translate relative to each other along the prismatic joint 114.

The prismatic joint 114 supports the flight controller 110 and the flight controller 112. In particular, the prismatic joint 114 removes a cantilever load or cantilever action from the flight controller 110 and the flight controller 112. The prismatic joint 114 allows the flight controller 110 and the flight controller 112 to translate linearly relative to each other while maintaining the support.

The assembly 100 maintains a load path from the set of extenders 102 through the mounting bracket 106, the flight controller 110, the prismatic joint 114, the flight controller 112, and the mounting bracket 108 to the set of extenders 104. The term load path may refer to a bidirectional transfer of loads through a path. Thus, a load of the flight controller 110 and the flight controller 112 are borne by the set of extenders 102 and the set of extenders 104. Bearing the load of the flight controller 110 and the flight controller 112 by the set of extenders 102 and the set of extenders 104 is particularly desirable where a pilot leans on or otherwise impacts with the flight controller 110 or the flight controller 112 during a high-g impact event.

In some embodiments, the prismatic joint 114 is a linear bearing. The linear bearing includes a roller bracket 116 and a receiver bracket 118. As depicted, the roller bracket 116 is coupled to the flight controller 110 and the receiver bracket 118 is coupled to the flight controller 112. It is further contemplated that the roller bracket 116 may be coupled to the flight controller 112 and the receiver bracket 118 may be coupled to the flight controller 110. In this regard, the roller bracket 116 is coupled to one of the flight controller 110 or the flight controller 112 and the receiver bracket 118 is coupled to a remaining of flight controller 110 and the flight controller 112.

In some embodiments, the receiver bracket 118 defines one or more channels. As depicted, the receiver bracket 118 includes two channels. The channels extend along a length of the receiver bracket 118. In some embodiments, the roller bracket 116 includes one or more rollers. For example, the roller bracket 116 is depicted as including eight of the rollers, although this is not intended to be limiting. The rollers are configured to rotate. The rollers are disposed within the channels of the receiver bracket 118. The rollers are configured to roll along the channel when the receiver bracket 118 translates relative to the roller bracket 116.

Although the prismatic joint 114 is described as including the roller bracket 116 and the receiver bracket 118, this is not intended as a limitation of the present disclosure. It is contemplated that the prismatic joint 114 may include any form of a linear guide mechanism. For example, the prismatic joint 114 may include, but is not limited to, a linear bearing, a reciprocating ball type linear bearing, a linear bushing, or the like.

Figure 2A:
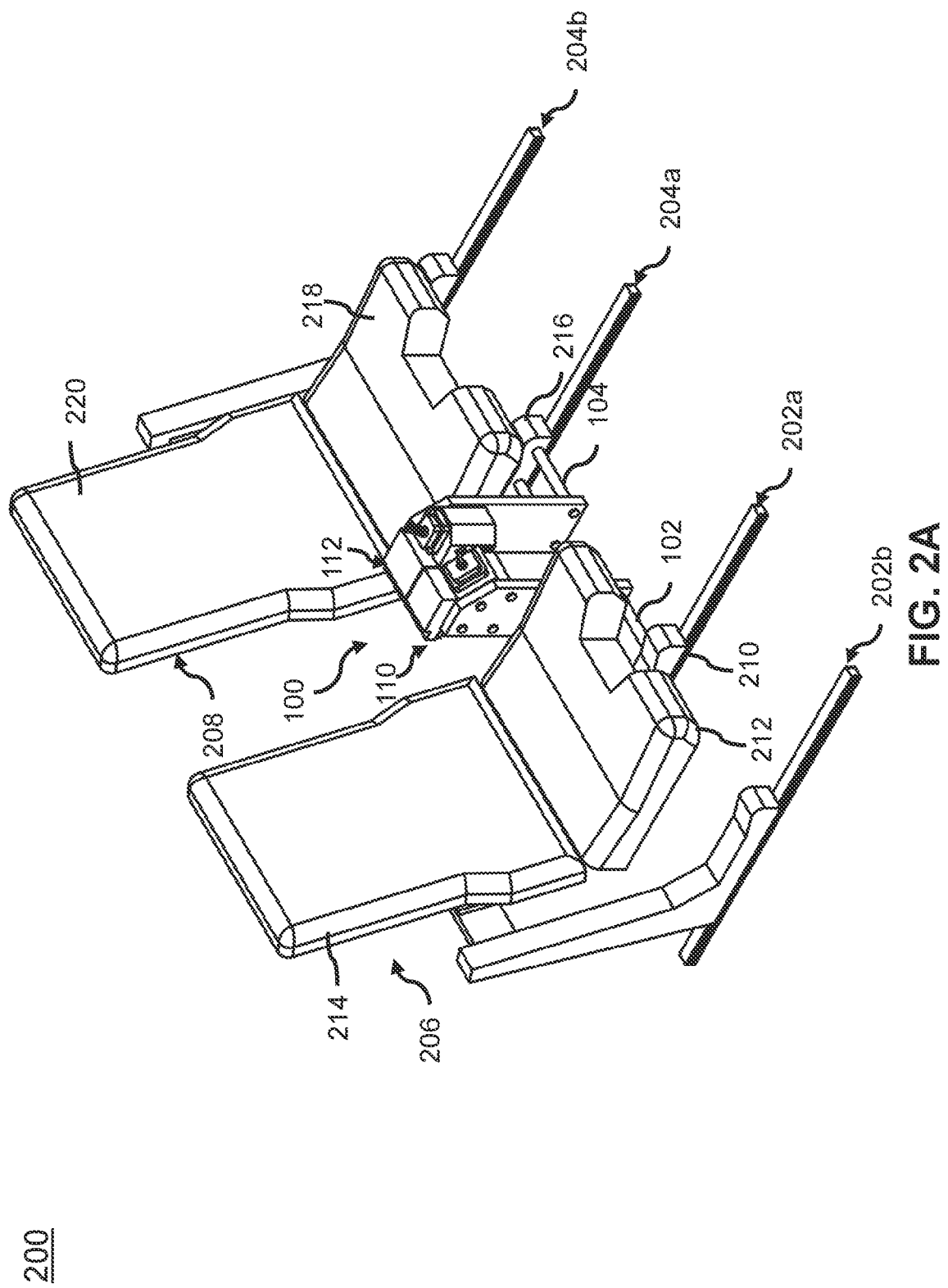
FIG. 2A depicts a left-front isometric view of system including an assembly with an inboard pilot flight controller and an inboard copilot flight controller in an aft position, in accordance with one or more embodiments of the present disclosure.
Figure 2B:
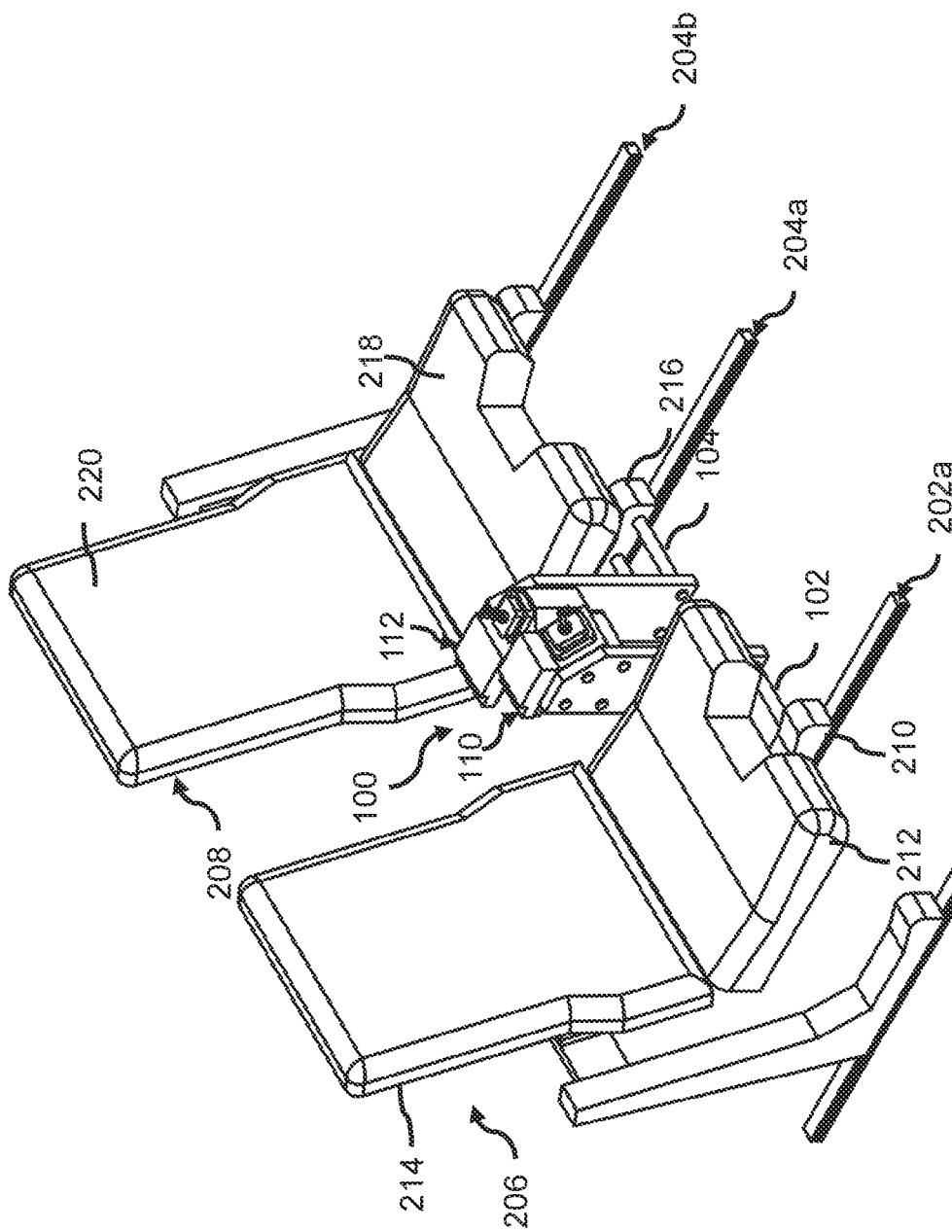
FIG. 2B depicts a left-front isometric view of a system including an assembly with an inboard pilot flight controller in a fore position and an inboard copilot flight controller in an aft position, in accordance with one or more embodiments of the present disclosure.
Figure 2C:
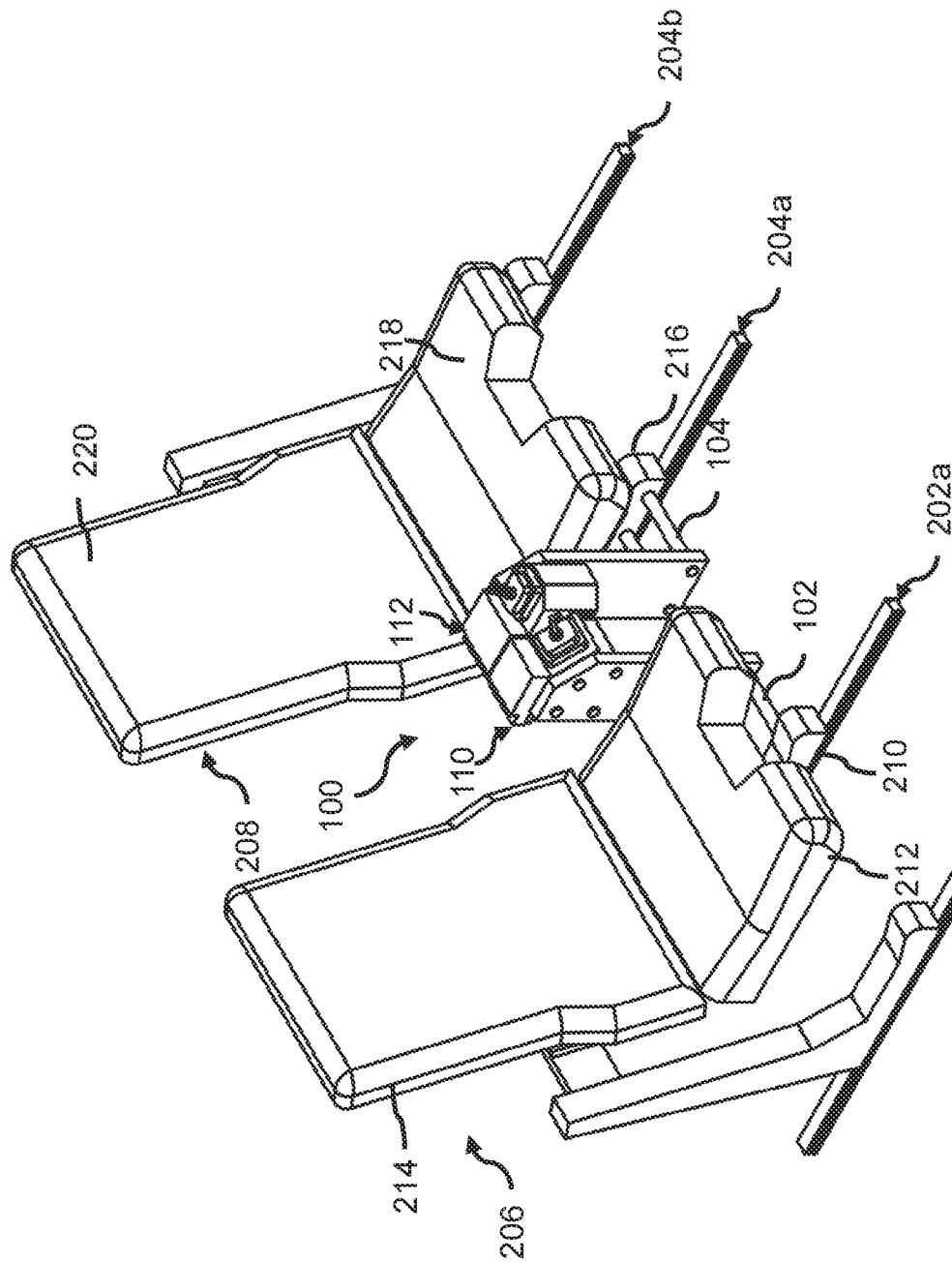
FIG. 2C depicts a left-front isometric view of system including an assembly with an inboard pilot flight controller and an inboard copilot flight controller in a fore position, in accordance with one or more embodiments of the present disclosure.
Figure 2D:
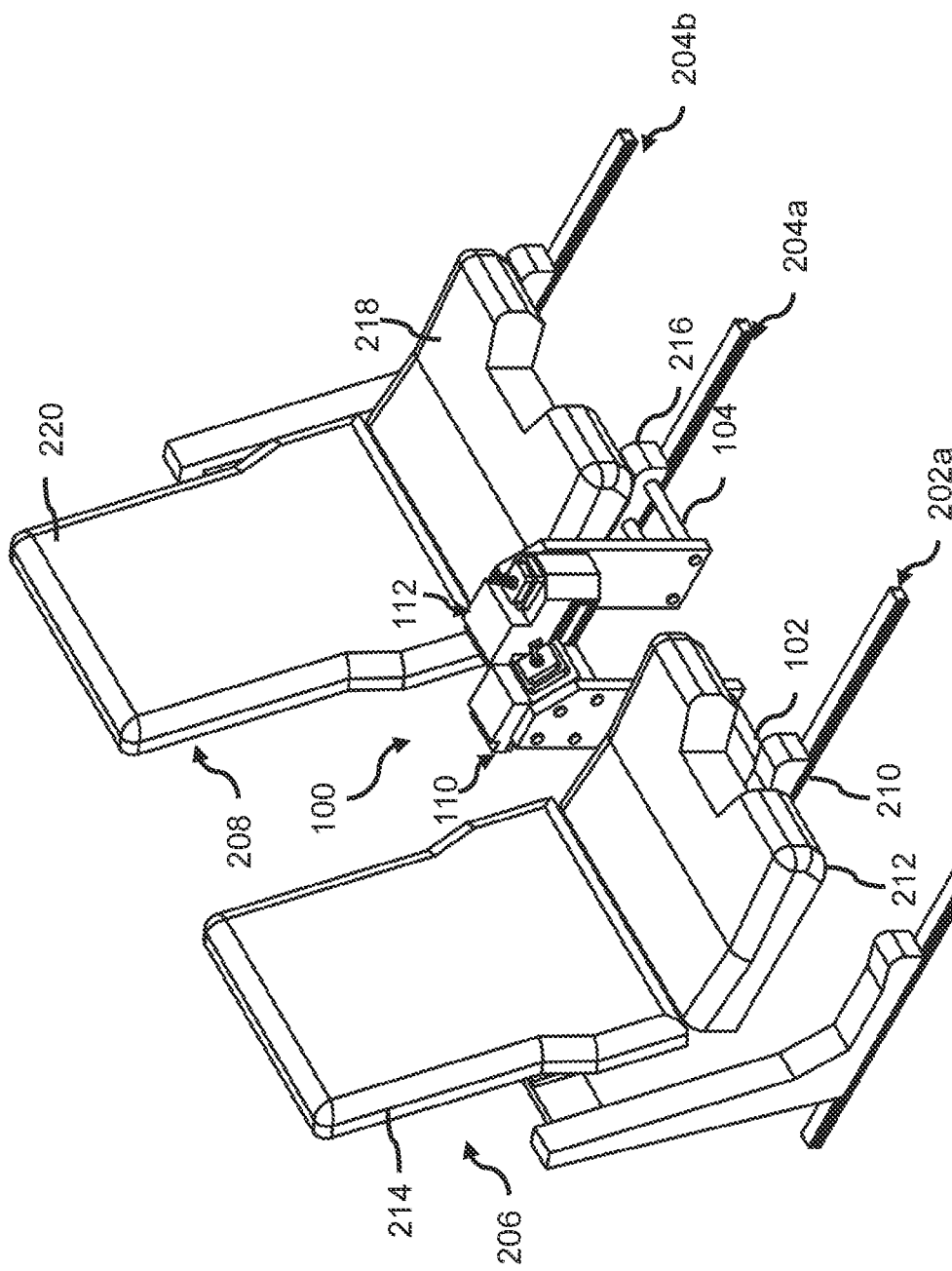
FIG. 2D depicts a left-front isometric view of system including an assembly with an inboard pilot flight controller in an aft position and an inboard copilot flight controller in an fore position, in accordance with one or more embodiments of the present disclosure.
Figure 2E:
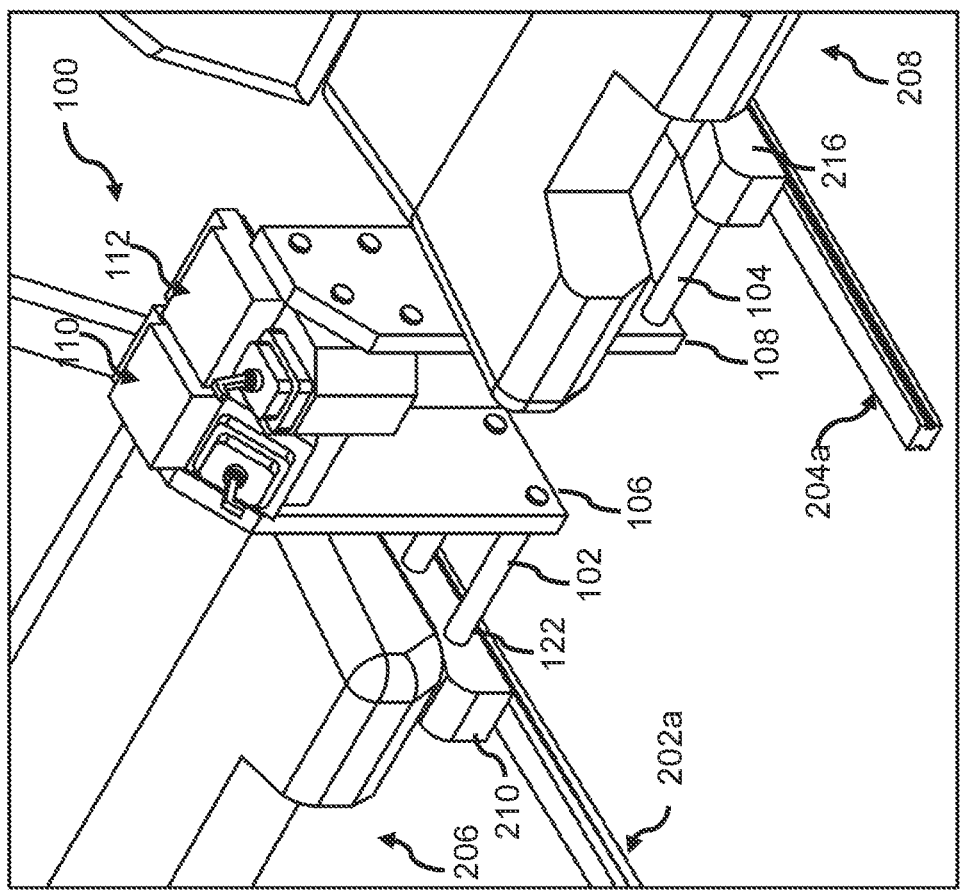
FIG. 2E depicts a partial right-front isometric view of system including an assembly, in accordance with one or more embodiments of the present disclosure.

Referring now to FIGS. 2A-2E, a system 200 is described, in accordance with one or more embodiments of the present disclosure. The system 200 includes one or more components, such as, but not limited to, the assembly 100, a set of floor tracks 202, a set of floor tracks 204, a seat 206, a seat 208, and the like.

The system 200 includes the assembly 100. The discussion of the assembly 100 is incorporated herein by reference in the entirety.

The system 200 includes the set of floor tracks 202. The set of floor tracks 202 may also be referred to as pilot floor tracks. The set of floor tracks 202 are coupled to a floor (not depicted) of an aircraft. The set of floor tracks 202 may include any configuration of floor track, such as, but not limited to, an L-track or the like. The set of floor tracks 202 may include an inboard floor track 202a and an outboard floor track 202b.

The system 200 includes the seat 206. The seat 206 may also be referred to as a pilot seat. The seat 206 includes one or more components, such as, but not limited to, a seat frame 210, a seat pan 212, a seat back 214, and the like. The seat frame 210 may also be referred to as a seat base. The seat 206 may include two of the seat frames 210. The two of the seat frames 210 may be referred to as an inboard seat frame and an outboard seat frame. The inboard seat frame is between the outboard seat frame and the seat 208. The seat frame 210 is coupled to the inboard floor track 202a. The seat frame 210 bears the weight of the seat pan 212 and the seat back 214 into the inboard floor track 202a. As may be understood, the depiction of the seat 206 is not intended to be limiting.

The seat frame 210 is configured to translate longitudinally (e.g., translate forward and aft) along the inboard floor track 202a. For example, the seat frame 210 may slide on the inboard floor track 202a. The translation of the seat frame 210 along the inboard floor track 202a causes the seat 206 to translate along the inboard floor track 202a.

The assembly 100 includes the extenders 102. The extenders 102 are coupled to the seat frame 210. The extenders 102 are rigidly coupled to the seat frame 210. The end 122 of the extenders 102 are coupled to the seat frame 210. In this regard, the end 120 of the set of extenders 102 are rigidly coupled to the mounting bracket 106 and the end 122 of the set of extenders 102 are rigidly coupled to the seat frame 210. The extenders 102 are coupled to an inboard face of the seat frame 210, or in other words, a face of the seat frame 210 closest to the seat 208. The extenders 102 are coupled to the inboard seat frame of the seat frames 210.

The seat frame 210, the set of extenders 102, the mounting bracket 106, and the flight controller 110 form a rigid body. Linear translation of any of the seat frame 210 then induces linear translation of the set of extenders 102, the mounting bracket 106, and the flight controller 110. In this regard, the seat frame 210 may be translated along the inboard floor track 202a. The set of extenders 102, the mounting bracket 106, and the flight controller 110 translate relative to the inboard floor track 202a with the seat frame 210. By coupling the extenders 102 to the seat frame 210, the flight controller 110 translates longitudinally with the seat frame 210. The flight controller 110 moves forward and aft with the seat 206. In this regard, the flight controller 110 may always be reachable by a pilot seated on the seat 206 when the seat frame 210 is translated.

The set of extenders 102, the mounting bracket 106, and the flight controller 110 are maintained at a constant height relative to the seat frame 210. In this regard, the flight controller 110 is maintained at a fixed-height in both the fore configuration and aft configuration.

The discussion of the set of floor tracks 202 and the seat 206 is incorporated herein by reference in the entirety as to the set of floor tracks 204 and the seat 208 respectively.

The system 200 includes the set of floor tracks 204. The set of floor tracks 204 may also be referred to as copilot floor tracks. The set of floor tracks 204 are coupled to a floor (not depicted) of an aircraft. The set of floor tracks 204 may include any configuration of floor track, such as, but not limited to, an L-track or the like. The set of floor tracks 204 may include an inboard floor track 204a and an outboard floor track 204b. The inboard floor track 202a and the inboard floor track 204a are parallel.

The system 200 includes the seat 208. The seat 208 may also be referred to as a copilot seat. The seat 208 includes one or more components, such as, but not limited to, a seat frame 216, a seat pan 218, a seat back 220, and the like. The seat frame 216 may also be referred to as a seat base. The seat 208 may include two of the seat frames 216. The two of the seat frames 216 may be referred to as an inboard seat frame and an outboard seat frame. The inboard seat frame is between the outboard seat frame and the seat 206. The seat frame 216 is coupled to the inboard floor track 204a. The seat frame 216 bears the weight of the seat pan 218 and the seat back 220 into the inboard floor track 204a. As may be understood, the depiction of the seat 208 is not intended to be limiting.

The seat frame 216 is configured to translate longitudinally (e.g., translate forward and aft) along the inboard floor track 204a. For example, the seat frame 216 may slide on the inboard floor track 204a. The translation of the seat frame 216 along the inboard floor track 204a causes the seat 208 to translate along the inboard floor track 204a.

The assembly 100 includes the extenders 104. The extenders 104 are coupled to the seat frame 216. The extenders 104 are rigidly coupled to the seat frame 216. The end 134 of the extenders 104 are coupled to the seat frame 216. In this regard, the end 132 of the set of extenders 104 are rigidly coupled to the mounting bracket 108 and the end 134 of the set of extenders 104 are rigidly coupled to the seat frame 216. The extenders 104 are coupled to an inboard face of the seat frame 216, or in other words, a face of the seat frame 216 closest to the seat 206. The extenders 104 are coupled to the inboard seat frame of the seat frames 216.

The seat frame 216, the set of extenders 104, the mounting bracket 108, and the flight controller 112 form a rigid body. Linear translation of any of the seat frame 216 then induces linear translation of the set of extenders 104, the mounting bracket 108, and the flight controller 112. In this regard, the seat frame 216 may be translated along the inboard floor track 204a. The set of extenders 104, the mounting bracket 108, and the flight controller 112 translate relative to the inboard floor track 204a with the seat frame 216. By coupling the extenders 104 to the seat frame 216, the flight controller 112 translates longitudinally with the seat frame 216. The flight controller 112 moves forward and aft with the seat 208. In this regard, the flight controller 112 may always be reachable by a pilot seated on the seat 208 when the seat frame 216 is translated.

The set of extenders 104, the mounting bracket 108, and the flight controller 112 are maintained at a constant height relative to the seat frame 216. In this regard, the flight controller 112 is maintained at a fixed-height in both the fore configuration and aft configuration.

The flight controller 110 and the flight controller 112 translate relative to each other. The translation of the flight controller 110 and the flight controller 112 relative to each other is parallel with the translation of the seats along the floor tracks. The seat 206 and the seat 208 independently translate between a fully aft and a fully forward position. The seat frame 210 is configured to translate longitudinally along the inboard floor track 202a independent of the seat frame 216. The seat frame 216 is configured to translate longitudinally along the inboard floor track 204a independent of the seat frame 210.

The flight controller 110 translates with the seat 206. The flight controller 110 is configured to translate longitudinally with the seat frame 210 via the set of extenders 102 and the mounting bracket 106. The flight controller 112 translates with the seat 208. The flight controller 112 is configured to translate longitudinally with the seat frame 216 via the set of extenders 104 and the mounting bracket 108. In this regard, the flight controllers move when the seats move. The flight controllers are then always at the same position relative to the seat preventing uncomfortable flight controller handling conditions. It is contemplated that moving the flight controller with the seat may prevent fatigue and increase safety. The assembly 100 allows the pilot and copilot seats to move independently of each other while retaining the prismatic joint 114 between the flight controller 110 and the flight controller 112.

The seat 206 and the seat 208 can freely move relative to each other via the prismatic joint 114 that couples the flight controller 110 and the flight controller 112. The flight controller 110 and the flight controller 112 remain coupled by the prismatic joint 114 as the flight controller 110 translates longitudinally with the seat frame 210 and as the flight controller 112 translates longitudinally with the seat frame 216.

The assembly 100 maintains a load path between the seat frame 210 and the seat frame 216. In this regard, the seat 206 is connected to the seat 208 by the assembly 100. All of the load of the assembly 100 is borne into the seat frame 210 and the seat frame 216. Bearing all of the load of the assembly into the seat frame 210 and the seat frame 216 may be desirable for certification purposes. For example, a complete load path is formed between the pilot and copilot seats that supports the flight controllers without mounting anything to a landing gear cover (not depicted). A load path is maintained from the seat frame, through the set of extenders 102, the mounting bracket 106, the flight controller 110, the prismatic joint 114, the flight controller 112, the mounting bracket 108, and the set of extenders 104 to the seat frame 216. The loads may then be distributed to the seat tracks 202 and the seat tracks 204, and subsequently to an airframe.

Each of the seat 206 and the seat 206 may include a lock assembly. The lock assembly may also be referred to as a floor tracking system. The lock assemblies lock each of the seats to the floor track and prevents relative motion of the flight controllers. Either of the lock assemblies may be disengaged to permit translation of the seat relative to the floor track and translation of the flight controllers. For example, the lock assembly may include one or more pop pins or the like. Locking the seat frame to the set of floor tracks then prevents motion of the seat relative to the set of floor tracks.

In some embodiments, the system 100 is housed in a cockpit of an aircraft (not depicted). The aircraft may include a transmission tunnel (not depicted). The transmission tunnel is disposed at a centerline of the cockpit. The transmission tunnel is configured to receive a landing gear or the like. The transmission tunnel may occupy a portion of the space between the mounting bracket 106 and the mounting bracket 108. The inboard floor tracks are offset from the centerline of the cockpit due to the transmission tunnel. In this regard, the extenders 102 and the extenders 104 may extend from the floor tracks to compensate for the offset in the inboard floor tracks. The length of the set of extenders 102 and the set of extenders 104 is selected to compensate for the offset. It is further contemplated that a length of the extenders may be reduced where the inboard floor tracks are less offset from the centerline of the cockpit.

In some embodiments, the assembly 100 provides sufficient structural rigidity to ensure the flight controller is maintained in position. A pilot may then access the flight controller to control the flight of the aircraft. In some embodiments, the seat and the assembly is configured to withstand a dynamic load of 35G or greater.

As used herein, a component may be rigidly coupled to another component. The components may be rigidly coupled using any suitable technique, such as, but not limited to, one or more fasteners, a weld, or the like. The components which are rigidly coupled may then form a rigid body with zero-degrees of freedom.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:
1. An assembly comprising:
a first set of extenders;
a first mounting bracket; wherein the first set of extenders are rigidly coupled to the first mounting bracket;
a first flight controller; wherein the first flight controller is rigidly coupled to the first mounting bracket;
a second set of extenders;
a second mounting bracket; wherein the second set of extenders are rigidly coupled to the second mounting bracket;

a second flight controller; wherein the second flight controller is rigidly coupled to the second mounting bracket; and a prismatic joint; wherein the first flight controller and the second flight controller are coupled by the prismatic joint; wherein the first flight controller and the second flight controller are configured to translate relative to each other along the prismatic joint.

2. The assembly of claim 1, wherein a load path is maintained from the first set of extenders through the first mounting bracket, the first flight controller, the prismatic joint, the second flight controller, and the second mounting bracket to the second set of extenders.

3. The assembly of claim 1, wherein the first set of extenders, the first mounting bracket, and the first flight controller form a first rigid body; wherein the second set of extenders, the second mounting bracket, and the second controller form a second rigid body.

4. The assembly of claim 1, wherein a first end of the first set of extenders are coupled to the first mounting bracket; wherein a first end of the second set of extenders are coupled to the second mounting bracket.

5. The assembly of claim 1, wherein the first set of extenders are rigidly coupled to a first face of the first mounting bracket; wherein the first flight controller is rigidly coupled to a second face of the first mounting bracket.

6. The assembly of claim 5, wherein the first face of the first mounting bracket is coplanar with the second face of the first mounting bracket.

7. The assembly of claim 1, wherein the prismatic joint is coupled to a side surface of the first flight controller and a side surface of the second flight controller.

8. The assembly of claim 1, wherein the prismatic joint is a linear bearing comprising a roller bracket and a receiver bracket.

9. The assembly of claim 8, wherein the roller bracket is coupled to one of the first flight controller or the second flight controller and the receiver bracket is coupled to a remaining of first flight controller and the second flight controller.

10. A system comprising:
a first inboard floor track;
a first seat comprising a first seat frame coupled to the first inboard floor track;
a second inboard floor track; wherein the first inboard floor track and the second inboard floor track are parallel;
a second seat comprising a second seat frame coupled to the second inboard floor track; and
an assembly comprising:
   a first set of extenders; wherein the first set of extenders are rigidly coupled to the first seat frame;
   a first mounting bracket; wherein the first set of extenders are rigidly coupled to the first mounting bracket;
   a first flight controller; wherein the first flight controller is rigidly coupled to the first mounting bracket;
   a second set of extenders; wherein the second set of extenders are rigidly coupled to the second seat frame;
   a second mounting bracket; wherein the second set of extenders are rigidly coupled to the second mounting bracket;
   a second flight controller; wherein the second flight controller is rigidly coupled to the second mounting bracket; and
   a prismatic joint; wherein the first flight controller and the second flight controller are coupled by the prismatic joint; wherein the first flight controller and the second flight controller are configured to translate relative to each other along the prismatic joint.

11. The system of claim 10, wherein the first seat frame is configured to translate longitudinally along the first inboard floor track independent of the second seat frame; wherein the second seat frame is configured to translate longitudinally along the second inboard floor track independent of the first seat frame.

12. The system of claim 11, wherein the first flight controller is configured to translate longitudinally with the first seat frame via the first set of extenders and the first mounting bracket; wherein the second flight controller is configured to translate longitudinally with the second seat frame via the second set of extenders and the second mounting bracket; wherein the first flight controller and the second flight controller remain coupled by the prismatic joint as the first flight controller translates longitudinally with the first seat frame and as the second flight controller translates longitudinally with the second seat frame.

13. The system of claim 12, wherein a load path is maintained from the first seat frame, through the first set of extenders, the first mounting bracket, the first flight controller, the prismatic joint, the second flight controller, the second mounting bracket, and the second set of extenders to the second seat frame.

14. The system of claim 10, wherein a first end of the first set of extenders are rigidly coupled to the first mounting bracket and a second end of the first set of extenders are rigidly coupled to the first seat frame; wherein a first end of the second set of extenders are rigidly coupled to the second mounting bracket and a second end of the second set of extenders are rigidly coupled to the second seat frame.

15. The system of claim 10, wherein the first flight controller and the second flight controller are maintained at a constant height relative each other as the first flight controller and the second flight controller translate relative each other along the prismatic joint.

* * * * *